United States Patent
Shim (10) Patent No.: US 10,598,990 B2
(45) Date of Patent: Mar. 24, 2020

(54) ARRAY SUBSTRATE FOR LIQUID CRYSTAL DISPLAYS AND LIQUID CRYSTAL DISPLAY INCLUDING THE SAME

(71) Applicant: LG Display Co., Ltd., Seoul (KR)

(72) Inventor: Seokho Shim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 50 days.

(21) Appl. No.: 15/851,388

(22) Filed: Dec. 21, 2017

(65) Prior Publication Data

US 2018/0180945 A1     Jun. 28, 2018

(30) Foreign Application Priority Data

Dec. 26, 2016  (KR) .......................... 10-2016-0178861

(51) Int. Cl.
    *G02F 1/1337*    (2006.01)
    *G02F 1/1368*    (2006.01)
    (Continued)

(52) U.S. Cl.
    CPC .......... *G02F 1/1337* (2013.01); *G02F 1/1368* (2013.01); *G02F 1/133345* (2013.01);
    (Continued)

(58) Field of Classification Search
    CPC ............. G02F 1/133723; G02F 1/1337; G02F 1/133345; G02F 1/1368; G02F 2201/50; G02F 2001/133776; G02F 1/133514; G02F 1/13378; G02F 1/133788; G02F 1/133707; G02F 1/133753; G02F 1/133784; G02F 1/3775; G02F 1/133719; G02F 1/0027; G02F 1/141; G02F 2001/133738;
    (Continued)

(56) References Cited

U.S. PATENT DOCUMENTS

2008/0137022 A1\* 6/2008 Komeno ............... G02F 1/1337
                                                              349/153
2015/0192813 A1\* 7/2015 Ochiai ................. G02F 1/1339
                                                               349/42

(Continued)

FOREIGN PATENT DOCUMENTS

KR    10-2015-0002116 A    1/2015
KR    10-2016-0083618 A    7/2016

*Primary Examiner* — Shan Liu
(74) *Attorney, Agent, or Firm* — Polsinelli PC (57) ABSTRACT

An array substrate for liquid crystal displays and a liquid crystal display including the same. The array substrate includes a display unit including a thin film transistor, a pad unit disposed at one side of the display unit, and a dummy unit disposed at the other side of the display unit. Here, a blocking unit for blocking a liquid crystal alignment layer from spreading is disposed on each of the pad and dummy units. A first blocking unit for blocking the liquid crystal alignment layer from spreading to the pad unit is disposed on the pad unit. A second blocking unit for blocking the liquid crystal alignment layer from spreading to the dummy unit is disposed on the dummy unit. The liquid crystal alignment layer can be blocked from spreading to the pad unit or to a pad unit of an adjacent array substrate in manufacture of a liquid crystal display, thereby enabling omission of a separate process for removing the liquid crystal alignment layer on the pad unit.

21 Claims, 5 Drawing Sheets

(51) Int. Cl.
*G02F 1/1333* (2006.01)
*G02F 1/1335* (2006.01)

(52) U.S. Cl.
CPC .......... *G02F 1/133723* (2013.01); *G02F 2001/133776* (2013.01); *G02F 2201/50* (2013.01)

(58) Field of Classification Search
CPC .......... G02F 2001/133769; G02F 2001/13787; G02F 2001/133746; G02F 2001/133749; G02F 2001/133773; G02F 2001/3548; G02F 2001/133742; G02F 2001/133761; G09G 2300/0495; G09G 2300/0486; H01L 21/02211; H05K 3/389; C08F 259/08; C09K 2019/548
USPC .................................................. 349/123–136
See application file for complete search history.

(56) References Cited

U.S. PATENT DOCUMENTS

| | | | |
|---|---|---|---|
| 2016/0035307 A1* | 2/2016 | Jeon | H01L 27/124 345/211 |
| 2016/0116772 A1* | 4/2016 | Cha | G02F 1/1339 349/123 |
| 2016/0363820 A1* | 12/2016 | Li | G02F 1/1337 |
| 2017/0010500 A1* | 1/2017 | Han | G02F 1/1345 |
| 2017/0059904 A1* | 3/2017 | Kim | G02F 1/1339 |

* cited by examiner

ARRAY SUBSTRATE FOR LIQUID CRYSTAL DISPLAYS AND LIQUID CRYSTAL DISPLAY INCLUDING THE SAME

CROSS-REFERENCE TO RELATED APPLICATION

This application claims the benefit of Korean Patent Application No. 10-2016-0178861, filed on Dec. 26, 2016 in the Korean Intellectual Property Office, the disclosure of which is incorporated herein by reference in its entirety.

BACKGROUND

Field of the Disclosure

The present disclosure relates to a display device, and more particularly, to an array substrate for liquid crystal displays and a liquid crystal display including the same that can prevent fine stains due to damages on an organic insulating layer caused by plasma ablation in removing a residual liquid crystal alignment layer on the electrode pads.

Description of the Background

With the development of various portable electronics, such as mobile communication terminals and notebook computers, there is increasing demand for flat panel displays applicable thereto.

Flat panel displays include liquid crystal displays, plasma display panels, organic light emitting diode displays, and the like. Among these flat panel displays, various studies have recently focused on liquid crystal displays and organic light emitting diode displays, which have various merits such as development of mass production techniques, simple driving means, low power consumption, high image quality, realization of large screens, and the like.

A liquid crystal display includes a display panel, which is formed by laminating a lower substrate including thin film transistors (TFTs) onto an upper substrate including color filters so as to face each other with a liquid crystal layer interposed therebetween, and a backlight unit supplying light to display images. Such a liquid crystal display displays images in response to image signals through adjustment of transmittance of light passing through a liquid crystal layer of each pixel according to a data voltage.

Figure 1:
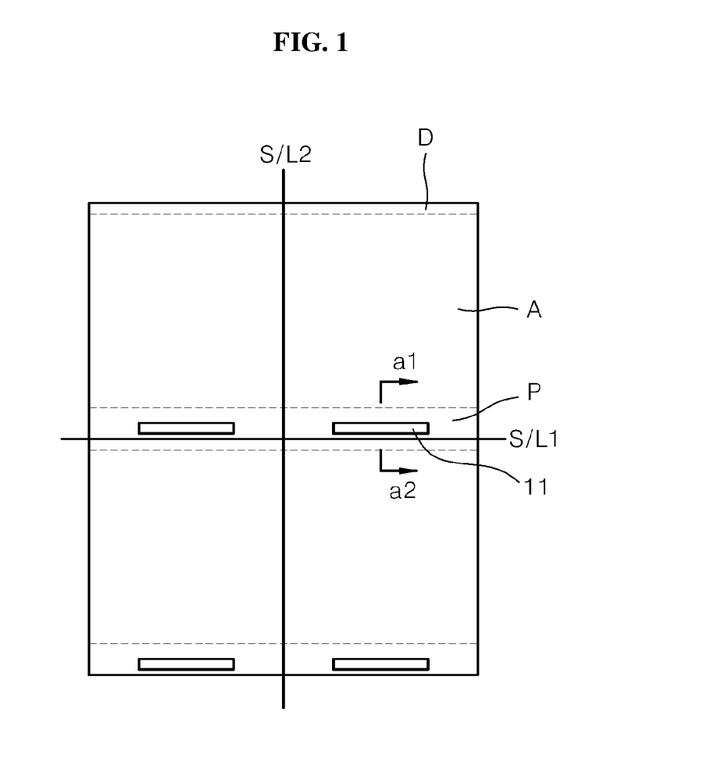
FIG. 1 is a top view of a parent substrate for manufacturing a plurality of array substrates including a liquid crystal alignment layer.
Figure 2:
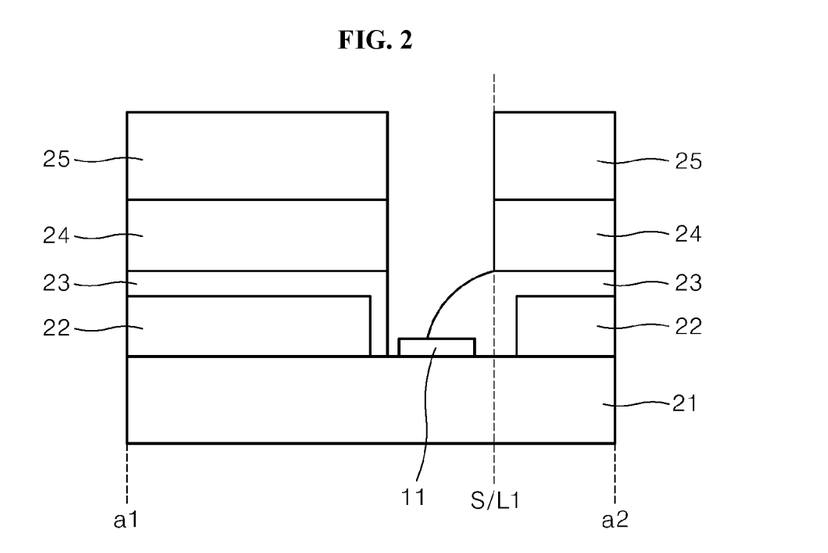
FIG. 2 is a cross-sectional view taken along Line a1-a2 of FIG. 1.

FIG. 1 is a top view of a parent substrate for manufacturing a plurality of array substrates including a liquid crystal alignment layer. FIG. 2 is a cross-sectional view taken along Line a1-a2 of FIG. 1.

Referring to FIGS. 1 and 2, the plurality of array substrates including the liquid crystal alignment layer is manufactured through a TFT process and a liquid crystal alignment layer coating process on the parent substrate, followed by a scribing process along scribe lines S/L1, S/L2.

Each of the array substrates includes a display unit A including thin film transistors, a pad unit P disposed at one outside of the display unit A and including an electrode pad 11 for driving the thin film transistors, and a dummy unit D disposed at the other outside of the display unit A. Here, the dummy unit D is disposed at an opposite side to the pad unit P with reference to the display unit A and is thus also referred to as a counter-pad unit. In addition, the pad unit P and the dummy unit D are non-display units.

In addition, a liquid crystal display includes an array substrate 21 including TFTs 22, a liquid crystal alignment layer 23 disposed on the array substrate 21, and a color filter substrate 25 including color filters 24. Further, a liquid crystal layer is interposed between the array substrate 21, on which the liquid crystal alignment layer 23 is disposed, and the color filter substrate 25. The liquid crystal alignment layer 23 is provided for initial alignment of liquid crystals and includes a polymeric material such as polyimide.

For example, polyimide in a liquid state is coated and cured to form a polyimide liquid crystal alignment layer, and upon coating, the pad unit and the dummy unit are also coated with the display unit. Since mobile liquid crystal displays have a narrow bezel and a very small pitch between adjacent cells, it is difficult to exclude coating on the pad unit or dummy unit.

As shown in FIG. 2, when the liquid crystal alignment layer spreads out to the pad unit of an adjacent cell beyond the dummy unit or up to the electrode pad of the corresponding cell, the liquid crystal alignment layer can remain on the electrode pad after a process of forming the liquid crystal alignment layer. The remaining liquid crystal alignment layer mainly includes an electrically insulating material and thus can cause poor electrical conductivity of the electrode pad.

Figure 3:
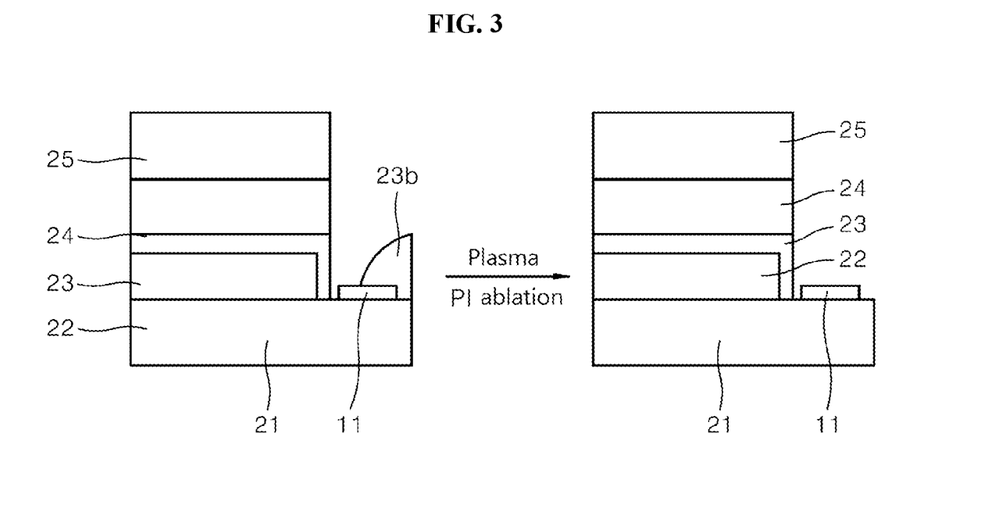
FIG. 3 is a schematic diagram illustrating a process for removing a liquid crystal alignment layer on a pad unit through plasma ablation after a scribing process.

FIG. 3 is a schematic diagram illustrating a process for removing the liquid crystal alignment layer 23 on the pad unit as set forth above in the description with reference to FIG. 2 by plasma ablation after a scribing process.

To prevent the liquid crystal alignment layer 23 from remaining on the electrode pad, the liquid crystal alignment layer remaining on the pad unit is removed by an ablation process using plasma after the scribing process, as shown in FIG. 3. In this case, there are problems, such as addition of a separate plasma process for removing the liquid crystal alignment layer, generation of fine stains due to damage on an organic insulating film upon the plasma process, and the like.

Therefore, there is a need for an array substrate for liquid crystal displays, which can prevent the liquid crystal alignment layer from remaining on the pad unit even without addition of the separate plasma process as set forth above.

SUMMARY

The present disclosure has been conceived to solve the problems as set forth above, and it is one aspect of the present disclosure to provide an array substrate for liquid crystal displays, which can omit a process for removing a liquid crystal alignment layer remaining on a pad unit through plasma ablation.

It is another aspect of the present disclosure to provide a display including the array substrate set forth above.

In accordance with one aspect of the present disclosure, an array substrate for liquid crystal displays includes a display unit, a pad unit, and a dummy unit. The display unit includes a thin film transistor. The pad unit is disposed at one side of the display unit and includes an electrode pad for driving the thin film transistor. The dummy unit is disposed at the other side of the display unit.

According to the present disclosure, a blocking unit for blocking a liquid crystal alignment layer from spreading is formed in each of the pad unit and the dummy unit. Specifically, a first blocking unit for blocking the liquid crystal alignment layer from spreading in a direction from the display unit to the pad unit is disposed on the pad unit. In addition, a second blocking unit for blocking the liquid crystal alignment layer from spreading in a direction from the display unit to the dummy unit is disposed on the dummy unit. The first blocking unit and the second blocking unit can effectively block the liquid crystal alignment layer from spreading from the display unit to the electrode pad and from the dummy unit to an electrode pad of an adjacent cell.

Each of the first blocking unit and the second blocking unit may include a plurality of grooves. The grooves of the first blocking unit may have a greater depth than the grooves of the second blocking unit.

For example, a region of the pad unit at the side of the electrode pad may include a glass substrate, a first metal pattern disposed on the glass substrate, an organic insulating film covering the first metal pattern, a first inorganic insulating film disposed on the organic insulating film, a plurality of second metal patterns disposed on the first inorganic insulating film and not connected to the electrode pad, and a second inorganic insulating film covering the plurality of second metal patterns, and the plurality of grooves of the first blocking unit may be stepped portions of the second inorganic insulating film around each of the plurality of second metal patterns. In this aspect, an effect of blocking the liquid crystal alignment layer from spreading in the direction from the display unit to the pad unit can be obtained using the plurality of second metal patterns not connected to the electrode pad.

In addition, a region of the pad unit between the electrode pad and the display unit may include a glass substrate, a first metal pattern disposed on the glass substrate, an organic insulating film covering the first metal pattern, a first inorganic insulating film disposed on the organic insulating film, a plurality of second metal patterns disposed on the first inorganic insulating film and connected to the electrode pad, and a second inorganic insulating film covering the plurality of second metal patterns, and the plurality of second metal patterns connected to the electrode pad may be arranged in a zigzag shape. Since the plurality of second metal patterns are arranged in a zigzag shape, the second inorganic insulating film covering the plurality of second metal patterns has uneven portions formed around the second metal patterns in the direction from the display unit to the pad unit. Therefore, the effect of blocking the liquid crystal alignment layer from spreading in the direction from the display unit to the pad unit can also be obtained in a wiring region of the pad unit.

The dummy unit may include a glass substrate, an organic insulating film disposed on the glass substrate, a first inorganic insulating film disposed on the organic insulating film, a plurality of second metal patterns disposed on the first inorganic insulating film and not connected to the electrode pad, and a second inorganic insulating film covering the plurality of second metal patterns, and the plurality of grooves of the second blocking unit may be stepped portions of the second inorganic insulating film and the first inorganic insulating film, in which the stepped portions are disposed between the plurality of second metal patterns. Preferably, the plurality of grooves of the second blocking unit are stepped portions of the second inorganic insulating film, the first inorganic insulating film and the organic insulating film, in which the stepped portions are disposed between the plurality of second metal patterns. As described above, since the dummy unit does not include a metal pattern for source/drain at a lower portion thereof and thus can have sufficiently deep grooves, the effect of blocking the liquid crystal alignment layer from spreading from the display unit to the dummy unit can be improved.

According to the present disclosure, on the array substrate for displays, the first blocking unit is disposed on the pad unit and the second blocking unit is disposed on the dummy unit, thereby effectively preventing the liquid crystal alignment layer from spreading to the electrode pad of the corresponding cell and to an electrode pad of an adjacent cell. Therefore, a process for removing the liquid crystal alignment layer of the pad unit by a separate plasma process can be omitted.

In addition, according to the present disclosure, grooves can be formed using a kind of dummy metal pattern which can be simultaneously formed upon formation of a third metal pattern connected to a pad even without use of a separate mask. Therefore, the grooves of each of the first blocking unit and the second blocking unit can be formed even without increasing the number of processes.

The array substrate according to the present disclosure, which has a structure of the pad unit and the dummy unit, is suitable for application to liquid crystal displays, particularly mobile liquid crystal displays having a built-in touch function.

BRIEF DESCRIPTION OF THE DRAWINGS

The accompanying drawings, which are included to provide a further understanding of the disclosure and are incorporated in and constitute a part of this application, illustrate aspects of the present disclosure and together with the description serve to explain the principle of the disclosure.

In the drawings.

DETAILED DESCRIPTION

Hereinafter, various aspects of the present disclosure will be described with reference to the accompanying drawings.

It should be understood that, although terms including ordinal numbers such as "first", "second" and the like may be used herein to describe various components, these components are not limited by these terms. These terms are used only to distinguish one component from another component.

In addition, it will be understood that when an element is referred to as being disposed "on" another element, the element may be directly placed on the other element while contacting the other element or an intervening element may also be present therebetween.

An array substrate for liquid crystal displays according to the present disclosure prevents a liquid crystal alignment layer from spreading to an electrode pad. As such, the present disclosure is aimed at preventing the liquid crystal alignment layer from remaining on the electrode pad even without a separate plasma process.

Referring to FIG. 1, the array substrate for liquid crystal displays according to the present disclosure includes a display unit A, a pad unit P, and a dummy unit D. The display unit A includes a thin film transistor. The pad unit P is disposed at one outside of the display unit A and includes an electrode pad 11 for driving the thin film transistor. The dummy unit D is disposed at the other outside of the display unit A. Here, the dummy unit D is disposed at an opposite side to the pad unit P with reference to the display unit A and is thus also referred to as a counter-pad unit. The pad unit P and the dummy unit D are non-display units.

In addition, a liquid crystal display according to the present disclosure includes an array substrate 21 including a TFT 22, a liquid crystal alignment layer 23 disposed on the array substrate 21, and a color filter substrate 25 including a color filter 24. Further, a liquid crystal layer is interposed between the array substrate 21, on which the liquid crystal alignment layer 23 is disposed, and the color filter substrate 25.

The liquid crystal alignment layer 23 is for initial alignment of liquid crystals and may include a polymeric material such as polyimide, polyamic acid, polyvinylcinnamate, polyazobenzene, polyethyleneimine, polyvinyl alcohol, polyamide, polyethylene, polystyrene, polyphenylene phthalamide, polyester, polyurethane, and polymethyl methacrylate. Among these polymers, polyimide is most widely used.

Figure 5:
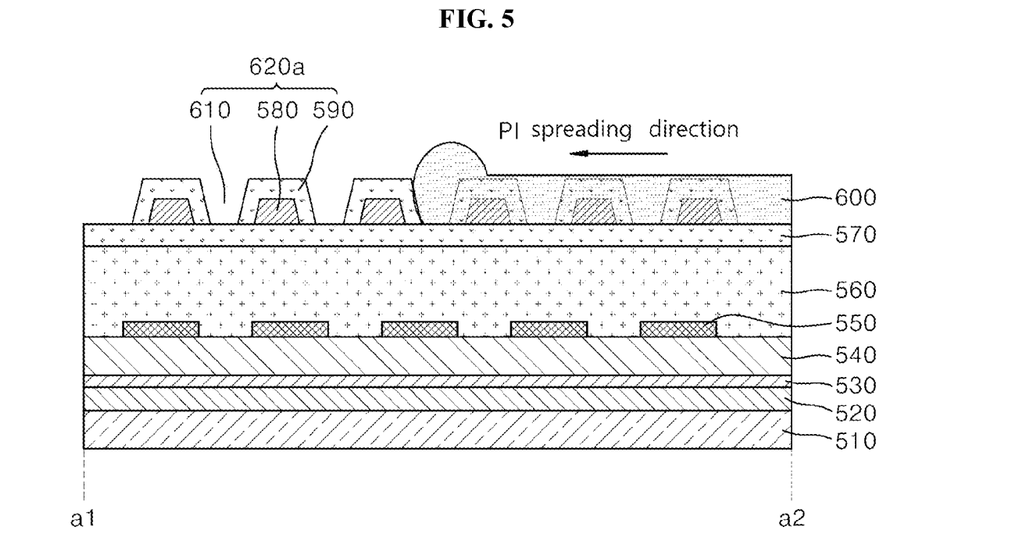
FIG. 5 is a cross-sectional view taken along Line a1-a2 of FIG. 4, illustrating cross-sections of Regions ⓐ and ⓒ of FIG. 4.
Figure 9:
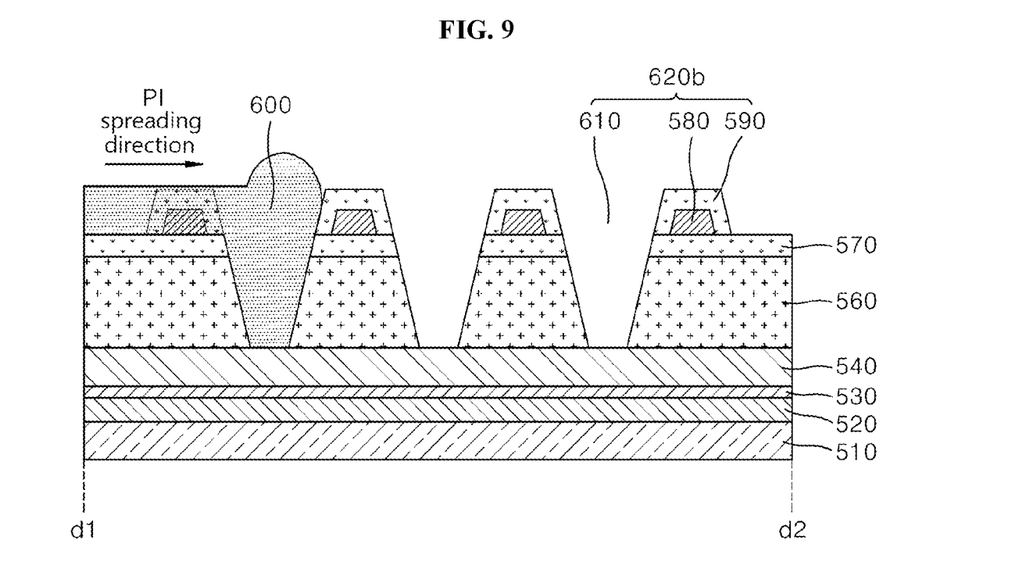
FIG. 9 is another cross-sectional view taken along Line d1-d2 of FIG. 7.

According to the present disclosure, for example, blocking units 620a, 620b for blocking the liquid crystal alignment layer from spreading are formed in the pad unit P and the dummy unit D, respectively, as shown in FIGS. 5 and 9.

Figure 8:
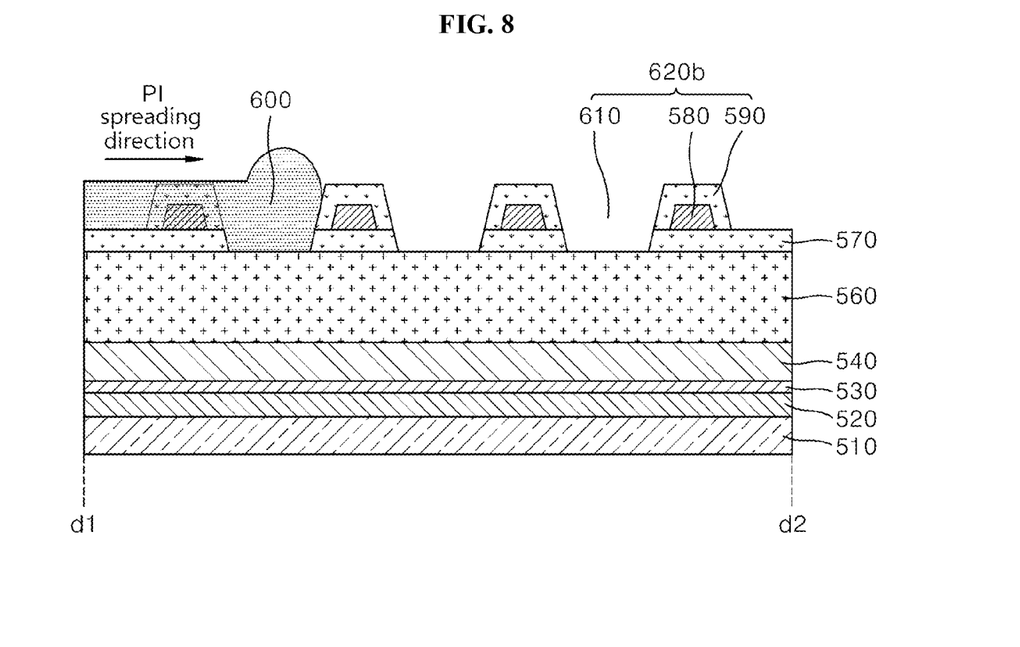
FIG. 8 is a cross-sectional view taken along Line d1-d2 of FIG. 7.

More specifically, on the pad unit P, a first blocking unit 620a for blocking the liquid crystal alignment layer from spreading in a direction from the display unit A to the pad unit P is disposed, as shown in FIG. 5. In addition, on the dummy unit D, a second blocking unit 620b for blocking the liquid crystal alignment layer from spreading in a direction from the display unit A to the dummy unit D is disposed, as shown in FIGS. 8 and 9. The second blocking unit 620b blocks the liquid crystal alignment layer from spreading to the electrode pad of the pad unit of an adjacent cell on the parent substrate of FIG. 1.

The first blocking unit 620a and the second blocking unit 620b can effectively block the liquid crystal alignment layer from spreading from the display unit A to the electrode pad 11 and from the dummy unit D to the electrode pad 11 of an adjacent cell.

The first blocking unit 620a may include a plurality of grooves 610 and the second blocking unit 620b may include a plurality of grooves 610. As such, each of the first blocking unit 620a and the second blocking unit 620b includes the plurality of grooves 610, whereby a liquid crystal alignment layer 600 is confined in the grooves 610, and even when passing over one groove 610, the liquid crystal alignment layer 600 can be confined in the next groove 610. More specifically, the first blocking unit 620a includes barriers and the grooves 610, which are formed by second metal patterns 580 and a second inorganic insulating film 590, as shown in FIG. 5, and the second blocking unit 620b includes the barriers and the grooves 610, which are formed by the second metal patterns 580 and the second inorganic insulating film 590, as shown in FIGS. 8 and 9.

The grooves 610 of the second blocking unit 620b may have a greater depth than the grooves 610 of the first blocking unit 620a. The pad unit P, on which the first blocking unit 620a is disposed, has first metal patterns 550 (shown in FIG. 5) for source/drain at a lower portion thereof, as shown in FIG. 5. Thus, if the grooves 610 of the first blocking unit 620a are formed up to an organic insulating film 560 (shown in FIG. 5), there can cause a problem of corrosion of the first metal patterns 550 for source/drain. However, the grooves 610 of the first blocking unit 620a may be formed up to a portion of the organic insulating film 560, which does not expose the metal patterns for source/drain. On the other hand, the dummy unit D, on which the second blocking unit 620b is disposed, does not have the metal patterns for source/drain at a lower portion thereof, as shown in FIGS. 8 and 9. Thus, in order to improve the efficiency of blocking the liquid crystal alignment layer from spreading, the grooves 610 may be formed to a sufficiently great depth.

Figure 4:
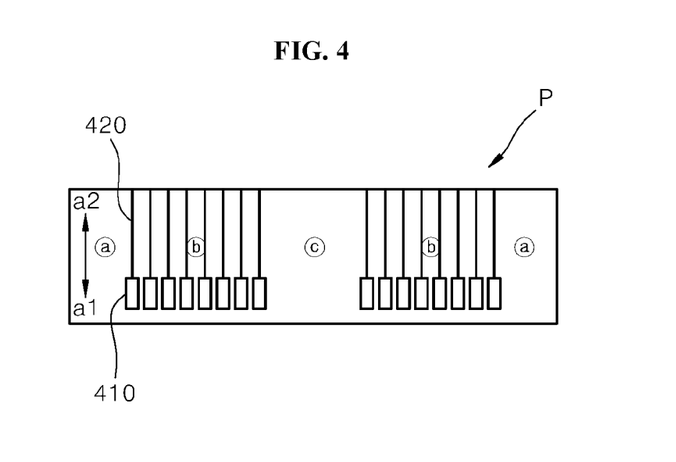
FIG. 4 is a schematic diagram illustrating one example in which electrode pads and wiring lines are disposed on the pad unit.
Figure 6:
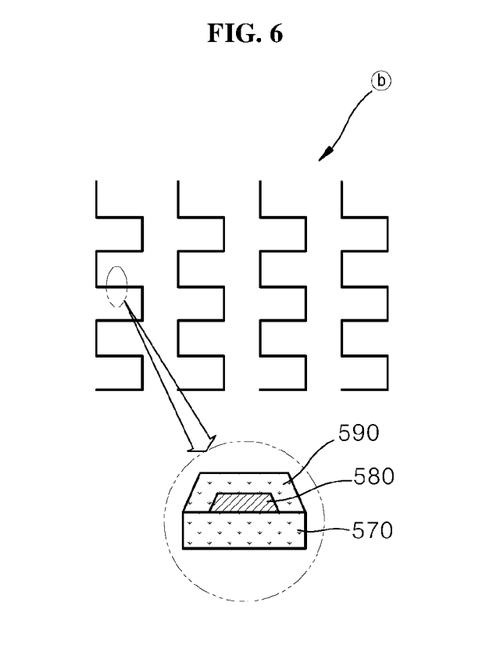
FIG. 6 is a schematic view of wiring lines of Region ⓑ of FIG. 4.

FIG. 4 is a schematic diagram illustrating one example in which electrode pads 410 and wiring lines 420 are disposed on the pad unit. FIG. 5 is a cross-sectional view taken along Line a1-a2 of FIG. 4, illustrating cross-sections of Regions ⓐ and ⓒ of FIG. 4, and FIG. 6 is a schematic view of wiring lines of Region ⓑ of FIG. 4.

Referring to FIGS. 4 and 5, a region of the pad unit P at the side of the electrode pads 410 includes a glass substrate 510, first metal patterns 550 disposed on the glass substrate 510, an organic insulating film 560 covering the first metal pattern 550, a first inorganic insulating film 570 disposed on the organic insulating film 560, a plurality of second metal patterns 580 disposed on the first inorganic insulating film 570 and not connected to the electrode pads 410, and a second inorganic insulating film 590 covering the plurality of second metal patterns 580. In addition, the region of the pad unit P at the side of the electrode pads 410 may further include a buffer layer 520, a gate insulating film 530, and an insulating interlayer 540 on the glass substrate 510. The organic insulating film may include a photo acryl compound (PAC) material, and the first and second inorganic insulating films may include a SiNx-based material.

These layers of the pad unit correspond to a buffer layer, a gate insulating film, an insulating interlayer, first metal patterns, an organic insulating film, a first inorganic insulating film, second metal patterns, and a second inorganic insulating film of the display unit, respectively. Here, the first metal patterns may be generally used as patterns for electrodes for a thin film transistor, such as electrodes for source/drain, and the second metal patterns may be used as signal lines for transferring common voltage or touch voltage to common electrodes or touch electrodes. The second metal patterns may also be used as electrode pads. A gate metal pattern is disposed between the buffer layer and the gate insulating film of the display unit, thereby constituting a thin film transistor (TFT) in conjunction with a first metal pattern. In addition, a pixel electrode is disposed on the organic insulating film of the display unit and connected to one of the first metal patterns.

Although the second metal patterns of the display unit are connected to the common electrodes, the touch electrodes, and the electrode pads, the dummy second metal patterns 580 of the pad unit according to the present disclosure are not electrically connected to other elements, and are formed simultaneously with the second metal patterns of the display unit to allow the grooves of the first blocking unit to be formed even without addition of a separate mask. The dummy second metal patterns 580 of the pad unit according to the present disclosure are not electrically connected to other elements and thus can be referred to as dummy metal patterns.

More specifically, the plurality of grooves 610 of the first blocking unit 620a may be stepped portions of the second inorganic insulating film 590 around each of the plurality of second metal patterns 580. That is, in the case of the example shown in FIG. 5, the second inorganic insulating film 590 covering the second metal patterns 580 may form the stepped portions around each of the second metal patterns 580 using the plurality of second metal patterns 580 not connected to the electrode pads, thereby obtaining the effect of blocking the liquid crystal alignment layer from spreading in the direction from the display unit to the pad unit.

Referring to FIG. 4, the wiring lines are disposed in Region ⓑ of the pad unit P between the electrode pads 410 and the display unit. The wiring lines generally have a linear shape and are generally arranged at very fine pitches. Thus, it is difficult to form a kind of second metal pattern not connected to the pad unit in Region ⓑ of the pad unit P between the electrode pads 410 and the display unit.

According to the present disclosure, the plurality of second metal patterns connected to the electrode pads 410 may have a zigzag shape, as shown in FIG. 6.

Since the plurality of second metal patterns have a zigzag shape, the second inorganic insulating film 590 covering the plurality of second metal patterns 580 has uneven portions around the second metal patterns 580 in the direction from the display unit to the pad unit, as shown in a cross-sectional view of FIG. 6 marked by a dashed line. Thus, the effect of blocking the liquid crystal alignment layer from spreading in the direction from the display unit to the pad unit can also be obtained in the wiring region of the pad unit. In other words, if it is difficult to form the dummy second metal patterns not electrically connected to other elements, the second metal patterns electrically connected to other elements have a zigzag shape, thereby preventing the liquid crystal alignment layer from spreading.

Figure 7:
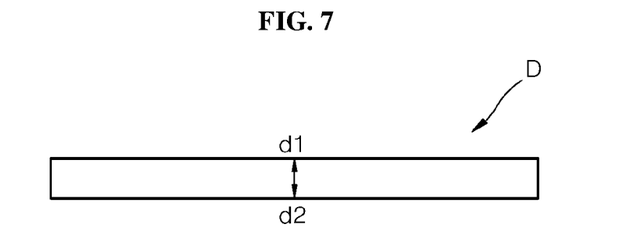
FIG. 7 is a schematic view of a dummy unit.

FIG. 7 is a schematic view of the dummy unit. FIG. 8 is a cross-sectional view taken along Line d1-d2 of FIG. 7. FIG. 9 is another cross-sectional view taken along Line d1-d2 of FIG. 7.

The dummy unit serves to secure a process margin in a scribing process and has a width of about 1 mm. Referring to FIGS. 8 and 9, the dummy unit D includes the glass substrate 510, the organic insulating film 560 disposed on the glass substrate 510, the first inorganic insulating film 570 disposed on the organic insulating film 560, the plurality of second metal patterns 580 disposed on the first inorganic insulating film 570 and not connected to the electrode pads, and the second inorganic insulating film 590 covering the plurality of second metal patterns 580. In addition, the dummy unit D may further include the buffer layer 520, the gate insulating film 530, and the insulating interlayer 540 on the glass substrate 510. These layers correspond to the buffer layer, the gate insulating film, the insulating interlayer, the organic insulating film, the first inorganic insulating film, the second metal patterns and the second inorganic insulating film of the pad unit P, respectively. However, the first metal patterns are not disposed on the dummy unit, unlike the pad unit.

The dummy second metal patterns, which are shown in FIG. 5 and not connected to the electrode pads, and the dummy second metal patterns, which are shown in FIGS. 8 and 9 and not connected to the electrode pads, are formed simultaneously with the second metal patterns, which are shown in FIG. 6 and connected to the electrode pads.

Referring to FIG. 8, the plurality of grooves 610 of the second blocking unit 620b may be stepped portions of the second inorganic insulating film 590 and the first inorganic insulating film 570, in which the stepped portions are disposed between the second metal patterns 580. Preferably, the plurality of grooves 610 of the second blocking unit 620b are stepped portions of the second inorganic insulating film 590, the first inorganic insulating film 570 and the organic insulating film 560, in which the stepped portions are disposed between the second metal patterns 580, as shown in FIG. 9.

The stepped portions formed up to the first inorganic insulating film 570 or the stepped portions formed up to the first inorganic insulating film 570 and the organic insulating film 560 may be formed by etching.

Since the dummy unit shown in FIGS. 8 and 9 does not have the metal patterns for source/drain at a lower portion thereof, the grooves 610 can be sufficiently deeply formed, thereby improving the effect of blocking the liquid crystal alignment layer from spreading from the display unit to the dummy unit.

The array substrate having the structure as set forth above is applied to liquid crystal displays, preferably mobile liquid crystal displays having a built-in touch function.

The liquid crystal display according to the present disclosure includes the array substrate 21, the liquid crystal alignment layer 23, and the color filter substrate 25, as shown in FIG. 2.

The array substrate 21 includes the display unit A including the thin film transistor 22, the pad unit P disposed at one side of the display unit A and including the electrode pads for driving the thin film transistor 22, and the dummy unit D disposed at the other side of the display unit A. As described above, the first blocking unit for blocking the liquid crystal alignment layer from spreading in the direction from the display unit to the pad unit is disposed on the pad unit P, and the second blocking unit for blocking the liquid crystal alignment layer from spreading in the direction from the display unit to the dummy unit is disposed on the dummy unit D.

The liquid crystal alignment layer 23 includes a polymeric material such as polyimide, and is disposed for initial alignment of liquid crystals. The liquid crystal alignment layer 23 can be suppressed from spreading by the structure of the pad and dummy units of the array substrate, as described above.

The color filter substrate 25 includes the color filter 24 and is laminated onto the array substrate 21 on which the liquid crystal alignment layer 23 is disposed.

In addition, the liquid crystal layer is interposed between the array substrate, on which the liquid crystal alignment layer is disposed, and the color filter substrate.

As described above, the first blocking unit may include the plurality of grooves 610 arranged in the direction from the display unit to the pad unit, and the second blocking unit may include the plurality of grooves 610 arranged in the direction from the display unit to the dummy unit. Here, the grooves 610 of the second blocking unit preferably have a greater depth than the grooves 610 of the first blocking unit.

As described above, on the array substrate for displays according to the present disclosure, the first blocking unit is disposed on the pad unit, and the second blocking unit is disposed on the dummy unit, thereby effectively preventing the liquid crystal alignment layer from spreading to the electrode pads of the corresponding cell or an adjacent cell. Thus, a process for removing the liquid crystal alignment layer of the pad unit by a separate plasma process can be omitted.

In addition, according to the present disclosure, the grooves 610 may be formed using a kind of dummy metal pattern which can be simultaneously formed upon formation of a third metal pattern connected to the pads even without using a separate mask. Thus, the grooves 610 of each of the first and second blocking units may be formed even without increasing the number of processes.

Although the present disclosure has been described with reference to some aspects, it should be understood that various modifications, changes, alterations, and equivalent aspects can be made by those skilled in the art without departing from the spirit and scope of the present disclosure.

What is claimed is:

1. An array substrate for liquid crystal displays, comprising:
    a display unit including a thin film transistor;
    a pad unit disposed at a first side adjacent to the display unit and including an electrode pad for driving the thin film transistor;
    a dummy unit disposed at a second side adjacent to the display unit, wherein the first side is opposite to the second side with respect to the display unit;
    a first blocking unit for blocking a material forming a liquid crystal alignment layer from spreading in a direction from the display unit to the pad unit is disposed at the pad unit; and
    a second blocking unit for blocking the material forming the liquid crystal alignment layer from spreading in a direction from the display unit to the dummy unit is disposed at the dummy unit,
    wherein each of the first and second blocking units which are separated from each other includes a plurality of barriers and each barrier includes a dummy metal pattern which is isolated and surrounded by an insulating film,
    wherein the first blocking unit includes a metal pattern that vertically overlaps another metal pattern and the second blocking unit includes a metal pattern that does not vertically overlap another metal pattern, and
    wherein a second groove between the barriers in the second blocking unit has a greater depth than a first groove between the barriers in the first blocking unit.

2. The array substrate according to claim 1, wherein the plurality of barriers are isolated by a plurality of grooves arranged in the direction from the display unit to the pad unit.

3. The array substrate according to claim 2, wherein the plurality of grooves of the first blocking unit is disposed in a region adjacent to the electrode pad of the pad unit.

4. The array substrate according to claim 3, wherein the region adjacent to the electrode pad of the pad unit comprises:
    a plurality of first metal patterns for source and drain electrodes of the thin film transistor;
    an organic insulating film covering the plurality of first metal patterns;
    a first inorganic insulating film disposed on the organic insulating film;
    a plurality of second metal patterns disposed on the first inorganic insulating film and electrically isolated from the electrode pad; and
    a second inorganic insulating film covering the plurality of second metal patterns,
    wherein the plurality of grooves of the first blocking unit are disposed between the plurality of second metal patterns covered by the second inorganic insulating film.

5. The array substrate according to claim 3, wherein a region between the electrode pad of the pad unit and the display unit comprises:
    a plurality of first metal patterns for source and drain electrodes of the thin film transistor;
    an organic insulating film covering the plurality of first metal patterns;
    a first inorganic insulating film disposed on the organic insulating film;
    a plurality of second metal patterns disposed on the first inorganic insulating film and connected to the electrode pad; and
    a second inorganic insulating film covering the plurality of second metal patterns, wherein the plurality of second metal patterns is connected to the electrode pad and has a zigzag shape.

6. The array substrate according to claim 1, wherein the plurality of barriers are isolated by a plurality of grooves arranged in the direction from the display unit to the dummy unit.

7. The array substrate according to claim 6, wherein the dummy unit comprises:
    a first organic insulating film;
    a first inorganic insulating film disposed on the first organic insulating film;
    a plurality of second metal patterns disposed on the first inorganic insulating film and electrically isolated from the electrode pad; and
    a second inorganic insulating film covering the plurality of second metal patterns, wherein the plurality of grooves of the second blocking unit are disposed in the first inorganic insulating film and between the plurality of second metal patterns covered by the second inorganic insulating film.

8. The array substrate according to claim 7, wherein the plurality of grooves of the second blocking unit are disposed in the first organic insulating film and the first inorganic insulating film and between the plurality of second metal patterns covered by the second inorganic insulating film.

9. The array substrate according to claim 1, wherein the first groove is arranged in the direction from the display unit to the pad unit, and the second groove is arranged in the direction from the display unit to the dummy unit.

10. A liquid crystal display comprising:
    an array substrate comprising:
    a display unit including a thin film transistor;
    a pad unit disposed at a first side adjacent to the display unit and comprising an electrode pad for driving the thin film transistor;
    a dummy unit disposed at a second side adjacent to the display unit, wherein the first side is opposite to the second side with respect to the display unit;
    a liquid crystal alignment layer disposed on the array substrate;
    a first blocking unit for blocking a material forming the liquid crystal alignment layer from spreading in a direction from the display unit to the pad unit is disposed at the pad unit;
    a second blocking unit for blocking the material forming the liquid crystal alignment layer from spreading in a direction from the display unit to the dummy unit is disposed at the dummy unit;
    a color filter substrate including a color filter and disposed on the array substrate; and
    a liquid crystal layer interposed between the array substrate and the color filter substrate, wherein each of the first and second blocking units which are separated from each other includes a plurality of barriers and each barrier includes a dummy metal pattern which is isolated and surrounded by an insulating film, wherein the first blocking unit includes a metal pattern that vertically overlaps another metal pattern and the second blocking unit includes a metal pattern that does not vertically overlap another metal pattern, and wherein a second groove between the barriers in the second blocking unit has a greater depth than a first groove between the barriers in the first blocking unit.

11. The liquid crystal display according to claim 10, wherein the first groove is arranged in the direction from the display unit to the pad unit, and the second groove is arranged in the direction from the display unit to the dummy unit.

12. An array substrate for liquid crystal displays, comprising:
- a display unit including a thin film transistor;
- a pad unit disposed at a first side adjacent to the display unit and including an electrode pad for driving the thin film transistor;
- a dummy unit disposed at a second side adjacent to the display unit, wherein the first side is opposite to the second side with respect to the display unit;
- a first blocking unit disposed at the pad unit and preventing a liquid crystal alignment layer material from remaining at the electrode pad; and
- a second blocking unit disposed at the dummy unit and preventing the liquid crystal alignment layer material from remaining at the dummy unit;

wherein each of the first and second blocking units which are separated from each other includes a plurality of barriers and each barrier includes a dummy metal pattern which is isolated and surrounded by an insulating film, wherein the first blocking unit includes a metal pattern that vertically overlaps another metal pattern and the second blocking unit includes a metal pattern that does not vertically overlap another metal pattern, and wherein a second groove between the barriers in the second blocking unit has a greater depth than a first groove between the barriers in the first blocking unit.

13. The array substrate according to claim 12, wherein the first blocking unit includes a plurality of first patterns disposed in a direction from the display unit to the pad unit.

14. The array substrate according to claim 13, wherein the second blocking unit includes a plurality of second patterns disposed in a direction from the display unit to the dummy unit.

15. The array substrate according to claim 14, wherein the plurality second patterns includes a second metal pattern and a second inorganic insulating film covering the second metal pattern.

16. The array substrate according to claim 13, wherein the plurality first patterns includes a first metal pattern and a first inorganic insulating film covering the first metal pattern.

17. The array substrate according to claim 13, wherein the plurality of first patterns are connected to the electrode pad and has a zigzag shape.

18. The array substrate according to claim 12, wherein the first and second blocking units have a height enough to stop movement of the liquid crystal alignment layer material from the display unit to the pad unit and the dummy unit.

19. The array substrate according to claim 12, further comprising:
- a plurality of source and drain electrode patterns of the thin film transistor at the pad unit;
- an organic insulating film covering the plurality of source and drain electrode patterns; and
- a second inorganic insulating film disposed on the organic insulating film.

20. The array substrate according to claim 12, further comprising:
- an organic insulating film at the dummy unit; and
- a second inorganic insulating film disposed on the organic insulating film, wherein the plurality of second blocking unit includes a plurality of grooves in the second inorganic insulating film.

21. The array substrate according to claim 20, wherein the plurality of second blocking unit further includes a plurality of grooves in the organic insulating film.

* * * * *